Jan. 25, 1938.   J. A. WEIDEMANN   2,106,261
METHOD OF FIXING AND PRESERVING GROSS ANATOMICAL SPECIMENS AND THE LIKE
Filed Nov. 30, 1936

Inventor
John A. Weidemann
By: Charles B. Cannon
His Attorney

Patented Jan. 25, 1938

2,106,261

UNITED STATES PATENT OFFICE 2,106,261

METHOD OF FIXING AND PRESERVING GROSS ANATOMICAL SPECIMENS AND THE LIKE

John A. Weidemann, Chicago, Ill.

Application November 30, 1936, Serial No. 113,501

27 Claims. (Cl. 35—20)

This invention relates to the art of fixing and preserving gross anatomical specimens and also entire dead bodies, both animal and human.

In the art of preserving and fixing gross anatomical specimens it has been the customary practice heretofore to immerse the same in a preservative solution of formaldehyde or other equivalent substance contained in a suitable specimen or museum jar. There are, however, a number of objectionable features incidental to the use of this practice and among these is the fact that when gross anatomical specimens are thus immersed they lose their natural color, possess the objectionable odor of formaldehyde or other preservative substance in which they are immersed, they shrink considerably from their natural size, become unnatural in appearance, and are, generally objectionable to handle, especially when the said specimens thus preserved are used for classroom or lecture teaching and demonstration.

An object of the present invention is, therefore, to provide a new and improved method of fixing and preserving gross anatomical specimens, as well as entire dead bodies, both animal and human, and the various organs, bones, parts, and tissues of the same, for classroom and lecture demonstration use, as well as for exhibition and use in museums and for other purposes, and which method will overcome and eliminate the above-mentioned and other objectionable features which are incidental to the use of the prior art methods.

An additional object of the present invention is to provide a method which will, in use, preserve gross anatomical specimens against decomposition and decay in such a manner that the said specimens will be odorless and less grotesque in appearance than it has been possible to make them heretofore, will be proof against the action of dust, and moisture, and will be unaffected, (as are wax models) by temperature changes ranging from approximately —20° C. to about 60° C.; will be unaffected by the usual handling and other conditions to which such specimens are customarily subjected when used for teaching and lecture demonstration purposes, and which may be left exposed in the open air without danger of deterioration or change caused by atmospheric conditions.

Another object of the present invention is to provide a new and improved method of fixing and preserving gross anatomical specimens, and by means of which method the said gross anatomical specimens may be fixed and preserved without the use of specimen or museum jars or containers of any type, and in a dry condition.

A further object of the present invention is to provide a new and improved method of fixing and preserving dead bodies, both animal and human, for long periods of time, as well as for fixing and preserving bones and parts of dead bodies without any appreciable shrinkage, decomposition or putrefaction.

Additional objects of the present invention are: to provide a method for fixing and preserving dead bodies, both animal and human, as well as the various organs, bones, tissues and other parts of the same, in such a manner that they are less grotesque and less objectionable in appearance than the specimens fixed and preserved according to the liquid-immersion methods now generally used; so that such structures as the veins, arteries, nerves, and muscles of the specimen may be artificially colored, either before or after the surface-coating operation, so as to render the same more distinct and readily visible, particularly by contrast with the color and appearance of the surface-coating of the completed specimen; and so that they may be preserved in the open air without the use of museum or specimen jars, or other containers of any type, and without the use of the fixing and preserving fluids now in general use.

A further object of the present invention is to provide a method of fixing and preserving dead human bodies and which is adaptable for use in conjunction with present day methods of embalming, and by means of which a dead human body may be preserved indefinitely against decomposition.

Still another object of the present invention is to provide a method of fixing and preserving which is adaptable for use, in general, with some changes and variations in technique and procedure, to the fixing and preserving of all forms of organic tissues, both animal and vegetable, and by means of which method the specimens thus treated, and the parts thereof, may be preserved in substantially their natural colors, size, shape, and general external appearance.

Figure 1:
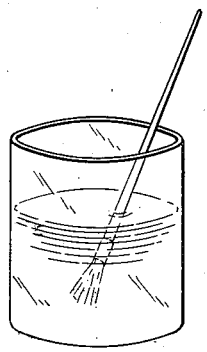
Fig. 1 is a perspective view showing a container of lacquer or other suitable material and a brush for applying a coating of such material to a gross anatomical specimen.
Figure 2:
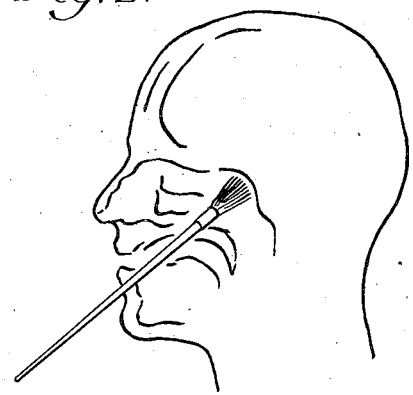
Fig. 2 is a mid-sagittal sectional view of a gross anatomical specimen showing the lacquer or the like being applied thereto.
Figure 3:
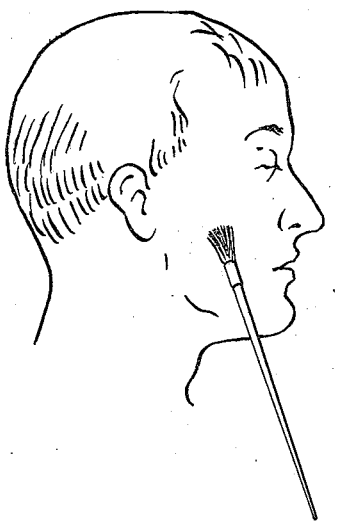
Fig. 3 is a side view of the specimen shown in Fig. 2.
Figure 4:
Fig. 4 is a sectional detail view illustrating the impregnation of the lacquer or the like through the tissues of the specimen shown in the drawing.

In the practice of the present method, as applied to gross anatomical specimens, and in which application it will probably find its greatest use, the specimen is first immersed in a bleaching solution such, for example, as a ten to twenty per cent solution of hydrogen peroxide ($H_2O_2$) (U. S. P.) for a period which may vary from one to seven days, depending upon the concentration of the bleaching solution, that is, when using the relatively stronger solutions, such as a 20% or 30% solution of $H_2O_2$ the time during which the specimen must be immersed may be shortened to from one to five days, whereas when using the relatively weaker bleaching solution, such as a 10% solution of hydrogen peroxide, the time of immersion should be about seven days. This is the first step in the practice of the present method and by means of it the specimen is thoroughly bleached so as to remove most, if not all, of any previous artificial coloring and preservative agents which may have been added or applied thereto. The thus bleached specimen is then thoroughly washed in water for a period which may vary from twelve to forty-eight hours, depending upon the length of time that the specimen was immersed in the bleaching solution of hydrogen peroxide or other equivalent bleaching solution.

It may be observed at this point that the purpose of this bleaching operation is to remove from the gross anatomical specimen any and all coloring or preservative materials which may have been applied thereto in the dissecting room from which such specimens are usually obtained. However, if the specimen should be obtained in a relatively clean condition, such as directly from the operating room, this bleaching operation may be eliminated entirely and the method begun by proceeding directly to the next step, which will now be described.

The next and usually second step in the present method of fixing and preserving a gross anatomical specimen is to dehydrate the same thoroughly and this is accomplished by immersing the bleached and washed specimen in a solution of a suitable dehydrating agent which may be, for example, either ethyl alcohol, methyl alcohol, or acetone. Thus, for example, the specimen may be immersed in a solution of ethyl alcohol or methyl alcohol, or acetone, which is preferably a relatively strong solution of the same, that is, from 50% to 100% (absolute) for a period which may vary from one to seventy-two hours depending upon the relative strength or concentration of the dehydrating solution and the previous condition of the specimen. A preferred manner of accomplishing this dehydrating operation is first to immerse the specimen in a solution of 50% alcohol for a period varying from one hour to seventy-two hours; then in a solution of 75% alcohol for the same length of time; then in a solution of 95% alcohol for a period ranging from 1 to 72 hours; and then in a solution of approximately 100%, or so-called absolute, alcohol for a like period of time, that is, from 1 to 72 hours, whereupon the specimen thus treated will be found to have been thoroughly dehydrated and in condition for the next and third step in the present method and which will now be described. It may be observed at this point, however, that other dehydrating agents such, for example, as acetone or other soluble ketones, or other equivalent dehydrating agents, may be used in place of either ethyl or methyl alcohol, and it may also be noted, at this point, that the use of the relatively weaker alcohols, which have heretofore been stated as being 50% and 75% alcohols, may be eliminated entirely if the previous condition of the specimen permits and the latter may, in this event, be immersed directly in the stronger dehydrating solution, that is, in the example stated, in the solution of approximately 95% alcohol and then in a solution of approximately 100% or so-called "absolute" alcohol.

The next and usually fourth step in the present method of fixing and preserving a gross anatomical specimen is as follows: The specimen is removed from the dehydrating solution, and while still wet, is then impregnated with a filler of lacquer or other equivalent protective, light-penetrable, adhesive material which may be applied to the external surface of the dehydrated specimen either by brushing, spraying or otherwise, and the specimen is, preferably, successively coated with from one to ten coatings of lacquer or other equivalent light-penetrable, protective, adhesive surface-coating material. The thus coated specimen is thereupon allowed to dry, either naturally or by retarded drying, and preferably by the latter method, this drying operation being varied somewhat according to the previous condition and state of preservation of the specimen and depending somewhat upon the size and general condition of the latter. By the term "retarded drying" as herein used is meant drying the specimen in a container which is provided with one or more apertures so as to allow a relatively small circulation of air into the container and into contact with the coated surface of the specimen.

It may be noted, in this connection, that the first coatings of lacquer or other equivalent light-penetrable, that is, transparent, adhesive surface-coating material are preferably applied to the dehydrated specimen by means of a brush since it will be found that by this method the lacquer or other equivalent coating material will infiltrate itself better into the tissues of the specimen than when applied by means of a spray gun. However, the later coatings of lacquer or other equivalent protective surface-coating material are preferably applied by means of a spray gun or other spraying device since it has been found that when the later coatings are thus applied they will produce a better lustre and color, and more gloss, in the completed specimen than is the case when the later coatings are applied by means of a brush.

The next and final, and usually fifth step, in the present method is really a continuation of the preceding or fourth step and consists in applying to the specimen, successively, additional coatings of lacquer or other equivalent and suitable transparent, protective, surface-coating material, this being preferably accomplished by spraying, for reasons stated above, and the number of such coatings varying from one to fifteen, depending upon the previous general condition and state of preservation of the specimen, and the source from which the same is obtained, that is, whether from the dissecting room, operating room, from a post mortem operation, etc. During this final step of applying additional coatings of lacquer or equivalent protective surface coating material to the specimen the drying of the successive coatings is again preferably done slowly and naturally so as to avoid the shrinkage which is apt to be caused by forced or artificial drying and it is to be noted, in this connection, that the time allowed to elapse between the successive applications of lacquer or other equivalent surface coating material, in steps four and five of the present method, may vary from one day to four weeks, depending upon the prior general condition and state of preservation of the specimen. It may be observed, in this connection, that in the case of some specimens, the prior condition of which is relatively bad, this relatively long period between successive coatings of lacquer may be necessary before the specimen may be considered complete and in condition for display or use as a museum specimen for teaching purposes.

It has been found, however, in the practice of the present method, that a gross anatomical specimen treated in the manner described above is fixed and preserved in such a manner that it will last indefinitely, is dry, does not show the shrinkage and distortion of specimens fixed and preserved by prior immersion methods, is generally unobjectionable to handle, is less grotesque in appearance and less objectionable to view than specimens preserved by immersion in specimen or museum jars, more closely resembles the natural color and living appearance of the specimen than specimens preserved according to prior methods, is non-fragile and not subject to damage in handling, and is generally a very satisfactory gross anatomical specimen for both museum and teaching purposes.

Another advantage of the present method of fixing and preserving gross anatomical specimens is that the various structures in the specimen, that is, the nerves, arteries, muscles and veins, may be artificially colored, either before or after the surface coating operation, so as to render the said structures more readily visible and to bring them out by contrast with the color and appearance of the completed specimen.

While it is possible to use other transparent, innately adhesive protective surface-coating materials for coating the dehydrated specimen, in the practice of the present method, it has been found by experiment and experience that the best material thus far found for this purpose is what is known as clear linoleum lacquer and which, when analyzed, shows the following composition:

Solids (21.8%) and which are made up as follows:

| | Per cent |
|---|---|
| Cotton | 60.0 |
| Resin | 32.0 |
| Plasticizer (dibutyl phthalate) | 8.0 |

Volatile content (78.2%) made up as follows:

| | Per cent |
|---|---|
| Butyl acetate | 30.0 |
| Butyl alcohol | 10.0 |
| Ethyl acetate | 20.0 |
| Toluol | 40.0 |

This lacquer makes a very satisfactory and permanent protective surface coating since it is innately adhesive, before being applied and dried, adheres well to the surface specimen, it is transparent so that when dried the completed specimen may be readily seen therethrough, it has a glossy, pleasing appearance and is unaffected by atmospheric conditions including moisture and temperature changes, and it has the additional desirable property of infiltration into the specimen and does not merely remain upon the external surface of the same.

A modification of the foregoing method, and which is especially adapted for use in fixing and preserving of gross anatomical specimens which are obtained in a relatively good state of preservation, as from the operating rooms of hospitals, etc., is as follows:

First the specimen may be subjected to the action of strong, or full strength, formaldehyde fumes for a period which may vary from five hours to a week, depending upon the size of the specimen; or the specimen may be immersed, for a period of from five hours to one week in a solution which is known as "Kaiserling No. 1" and which is a water solution of potassium acetate, potassium nitrate and formaldehyde; or the specimen may be immersed in a water solution of formaldehyde which may vary from 5% to 30% in strength, (the latter percentage being equivalent to 3 parts of the usual commercial formaldehyde or formalin in 7 parts of water, and, it being noted, in this connection, that the ordinary commercial formaldehyde or "Formalin" is an approximately 40% solution of formaldehyde gas in water).

The specimen treated and fixed according to any one of the three alternative methods set forth in the preceding paragraph may then be dehydrated by immersion in a bath of cold acetone which should preferably be kept at a temperature ranging from −10° C. to −70° C. by means of so-called "dry ice" (solid $CO_2$) or by means of some other suitable refrigerant. A preferred manner of accomplishing this is to immerse the specimen in a container filled with acetone and then to place this container in a second container filled with acetone and "dry ice" or solid $CO_2$ so that the container housing the specimen is surrounded by a refrigerating mixture of acetone and solid $CO_2$. The specimen is allowed to remain in this cold acetone solution for a period varying from fifteen minutes to six hours, depending upon the size of the specimen, whereupon the thus dehydrated specimen may be coated with lacquer or other surface-coating material, as hereinbefore described.

It may be noted, at this point, however, that if the first immersion in cold acetone, set forth in the preceding paragraph, does not completely dehydrate the specimen the foregoing dehydrating operation may be repeated by immersing the specimen in a fresh bath of acetone, and whether or not the dehydrating operation has been complete may be determined by removing the specimen from the cold acetone bath and applying an initial coating of lacquer whereupon it will be found that if the lacquer coating turns milky or cloudy in appearance the specimen has not been completely dehydrated and the dehydrating operation must be repeated, whereas if the lacquer coating remains transparent and glossy the dehydration of the specimen has been complete and need not be repeated.

While the present method has been described hereinbefore as applied to the fixing and preserving of gross anatomical specimens it may also be used, with some modifications and variations, in conjunction with present day methods of embalming dead human bodies, the principal difference being, in the latter case, that after the body has been embalmed in the usual present day temporary manner it is then immersed in a preservative solution such, for example, as a five to thirty per cent water solution of formaldehyde, to which has been added from 25 to 100 grams of sodium chloride for each 1000 c. c. of formaldehyde solution, and it is allowed to remain immersed in this fixing and preservative solution for a period which may vary from five hours to one week, depending upon the length of time for which it is desired to preserve the body and upon its prior general condition and state of preservation.

The body thus treated may then be dehydrated by any one of the several dehydrating methods hereinbefore set forth relative to the fixing and preserving of gross anatomical specimens.

The body thus treated is then coated with successively applied coatings of lacquer or other suitable transparent, innately adhesive, protective surface-coating material, in the manner already described for the fixing and preserving of gross anatomical specimens, whereupon it will be found that a body thus treated will be preserved indefinitely against decomposition and in a generally satisfactory condition.

It may be noted, in this connection, that in the use of the new method as applied to dead human bodies the step of bleaching in hydrogen peroxide, or other equivalent bleaching agent, may be entirely eliminated in the case of recently deceased bodies, or bodies which have been embalmed according to approved present day methods, whereas this bleaching operation may be employed in cases where the body is in a bad state of preservation or has not been properly embalmed.

By the term "embalming", as used hereinbefore, and as used hereinafter in certain of the claims, is meant the customary present day manner of embalming dead human bodies which is now in use and according to which the abdominal cavity is eviscerated and a preservative solution is injected into the arterial system so as to keep the body in a good state of preservation for the few days usually intervening between the time of death and the funeral of the deceased.

While the present invention will probably find its greatest use as a method to be used in medical schools and other places for fixing and preserving gross anatomical specimens it is also intended and adapted for use by medical supply houses wherein the present method may be employed for fixing and preserving gross anatomical specimens which are intended for sale to medical schools, museums, hospitals, students, etc.

Having thus described my invention, what I claim as new and desire to protect by Letters Patent is:

1. A method of fixing and preserving gross anatomical specimens comprising the steps of first immersing the specimen in a bleaching solution, then immersing the thus bleached specimen in a dehydrating solution, and finally successively applying to the thus bleached and dehydrated specimen, while the same is still in a moist condition, due to immersion in the dehydrating solution, a series of coatings of transparent lacquer.

2. A method of fixing and preserving gross anatomical specimens comprising the steps of first bleaching the said specimen, then dehydrating it, and finally impregnating the bleached and dehydrated specimen with a filler of transparent, adhesive material.

3. A method of fixing and preserving gross anatomical specimens comprising the steps of first immersing the specimen in a solution of hydrogen peroxide so as to bleach the same, then immersing the thus bleached specimen in a solution of alcohol so as to dehydrate the same, and finally impregnating the thus bleached and dehydrated specimen with transparent lacquer.

4. A method of fixing and preserving gross anatomical specimens comprising the steps of first thoroughly dehydrating the said specimen, and then impregnating the thoroughly dehydrated specimen with a filler of transparent lacquer.

5. A method of fixing and preserving anatomical specimens comprising the steps of first thoroughly dehydrating the said specimen by immersing the same in a dehydrating solution, and then impregnating the thoroughly dehydrated specimen, while the same is still in a moist condition due to immersion in the dehydrating solution, with a filler of adhesive, light-penetrable material.

6. A method of fixing and preserving anatomical specimens comprising the steps of first bleaching the specimen, then thoroughly dehydrating it and finally impregnating the bleached and thoroughly dehydrated specimen with a filler of adhesive, light-penetrable material.

7. A method of fixing and preserving gross anatomical specimens comprising the steps of first immersing the specimen in a bleaching solution so as to bleach the same, then immersing the thus bleached specimen in a dehydrating solution so as to thoroughly dehydrate it, and finally impregnating the bleached and dehydrated specimen, while the same is still in a moist condition due to immersion in the dehydrating solution, with a filler of adhesive, light-penetrable material.

8. A method of fixing and preserving anatomical specimens comprising the steps of first immersing the specimen in a bleaching solution so as to bleach the same, then immersing the thus bleached specimen in a dehydrating solution so as to thoroughly dehydrate it, and finally impregnating the thus bleached and thoroughly dehydrated specimen with a filler of lacquer.

9. A method of fixing and preserving gross anatomical specimens comprising the steps of first fixing the specimen by subjecting the same to the action of formaldehyde, then thoroughly dehydrating the specimen by immersing the same in a bath of cold acetone, and then impregnating the thus fixed and thoroughly dehydrated specimen with a filler of lacquer.

10. A method of fixing and preserving gross anatomical specimens comprising the steps of first fixing the specimen by subjecting the same to the action of formaldehyde, then thoroughly dehydrating the specimen by immersing it in a bath of cold acetone, and then impregnating the thus fixed and thoroughly dehydrated specimen with a filler of adhesive, transparent material.

11. A method of fixing and preserving gross anatomical specimens comprising the steps of first thoroughly dehydrating the specimen by immersing the same in a bath of cold acetone, and then impregnating the thus thoroughly dehydrated specimen with a filler of lacquer.

12. A method of fixing and preserving gross anatomical specimens comprising the steps of first thoroughly dehydrating the specimen by immersing the same in a bath of cold acetone, and then impregnating the thus thoroughly dehydrated specimen with a filler of adhesive transparent material.

13. A method of fixing and preserving dead bodies comprising the steps of first embalming the body, then dehydrating it, and finally impregnating the embalmed and dehydrated body with a filler of light-penetrable, adhesive material.

14. A method of fixing and preserving dead bodies comprising the steps of first embalming the body, then immersing the embalmed body in a dehydrating solution so as to dehydrate the same, and finally impregnating the embalmed and dehydrated body with a filler of transparent lacquer.

15. A method of fixing and preserving dead bodies comprising the steps of first embalming the body, then immersing the embalmed body in a solution of alcohol so as to thoroughly dehydrate the same, and finally impregnating the embalmed and dehydrated body, while the same is still in a moist condition as a result of immersion during the dehydrating operation, with a filler of lacquer.

16. A method of fixing and preserving dead bodies comprising the steps of first embalming the body, then immersing the embalmed body in a solution of acetone so as to thoroughly dehydrate the same, and finally impregnating the embalmed and dehydrated body, while the latter is still in a moist condition as a result of immersion during the dehydrating operation, with a filler of transparent lacquer.

17. A method of fixing and preserving specimens of non-vital organic tissues, comprising the steps of first thoroughly dehydrating the specimen, and then impregnating the thoroughly dehydrated specimen with a filler of light-penetrable material.

18. A method of fixing and preserving specimens of non-vital organic tissues, comprising the steps of first thoroughly dehydrating the specimen, and then impregnating the thoroughly dehydrated specimen with a filler of transparent lacquer.

19. A method of fixing and preserving non-vital animal and vegetable tissues, comprising the steps of first dehydrating the specimen by immersing the same in a dehydrating solution, and then impregnating the dehydrated specimen, while the same is still in a moist condition as a result of immersion during the dehydrating operation, with a filler of lacquer.

20. A gross anatomical specimen consisting of a rigid mass of thoroughly dehydrated but unshrunk dead animal or human tissue impregnated throughout the tissues thereof and on the external surface of the same with a filler of light-penetrable, adhesive material.

21. A gross anatomical specimen consisting of a rigid mass of thoroughly dehydrated but unshrunk dead animal or human tissue saturated with a mass of transparent dry adhesive material.

22. A gross anatomical specimen consisting of a rigid mass of thoroughly dehydrated dead animal or human tissue saturated with a mass of transparent dry adhesive material.

23. A gross anatomical specimen consisting of a rigid mass of thoroughly dehydrated but unshrunk dead animal or human tissue saturated with a mass of transparent dry lacquer.

24. A gross anatomical specimen consisting of a rigid mass of thoroughly dehydrated dead animal or human tissues saturated with a mass of transparent dry lacquer.

25. A gross anatomical specimen consisting of a mass of thoroughly dehydrated but unshrunk dead animal or human tissue impregnated throughout the entire body thereof with a filler of light-penetrable adhesive material.

26. A gross anatomical specimen consisting of a rigid mass of thoroughly dehydrated but unshrunk dead animal or human tissue impregnated throughout the entire body thereof with a filler of transparent lacquer.

27. A gross anatomical specimen consisting of a mass of thoroughly dehydrated but unshrunk dead organic tissue impregnated throughout the entire body thereof with a filler of transparent lacquer.

JOHN A. WEIDEMANN.